United States Patent [19]

Wheeler

[11] 4,321,659
[45] Mar. 23, 1982

[54] NARROW-BAND, AIR-COOLED LIGHT FIXTURE

[76] Inventor: Ernest E. Wheeler, 5938 Eton Ct., San Diego, Calif. 92122

[21] Appl. No.: 164,721

[22] Filed: Jun. 30, 1980

[51] Int. Cl.³ .............................................. F21V 9/00
[52] U.S. Cl. .................................. 362/293; 362/294; 362/311; 362/373
[58] Field of Search ................ 362/293, 291, 311, 373

[56] References Cited

U.S. PATENT DOCUMENTS 3,180,981  4/1965  Ulffers ................................. 362/294
3,831,021  8/1974  Muhlogger ........................ 362/294

Primary Examiner—Stephen J. Lechert, Jr.
Attorney, Agent, or Firm—Frank D. Gilliam

[57] ABSTRACT

A simple, light-weight air-cooled filter arrangement for a narrow band pass filtered light fixture. In lighting fixtures such as infrared energy sources or stage lighting, it is necessary to filter a conventional broad spectrum energy source so that only energy in the desired region is transmitted. These filters which absorb energy in bands other than that being transmitted tend to become very hot. A light fixture is provided having a plurality of spaced filters near a light output end. Each filter has one or more openings offset from the openings in other filters so that no single straight path passes through openings in all filters. A light source is provided adjacent to the filter pack, with a fan positioned on the side of the source opposite the filter pack, with openings in the fixture housing beyond the fan. In operation, the filter pack absorbs energy in all spectral regions other than the band which the pack was designed to pass. The fan draws air in through the filter pack, past the light source and ejects it out through the openings. This fixture is simple, light-weight and cool in operation.

7 Claims, 3 Drawing Figures

U.S. Patent  Mar. 23, 1982  4,321,659
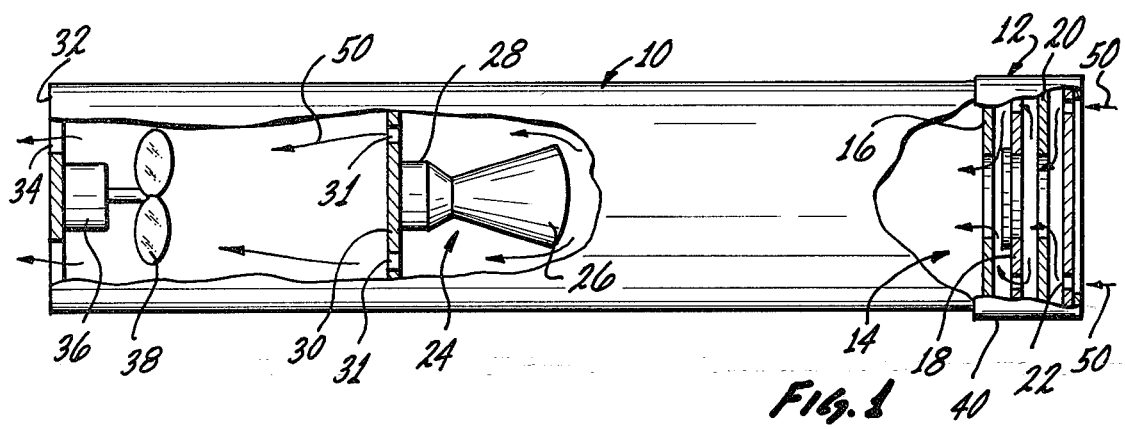
Fig. 1
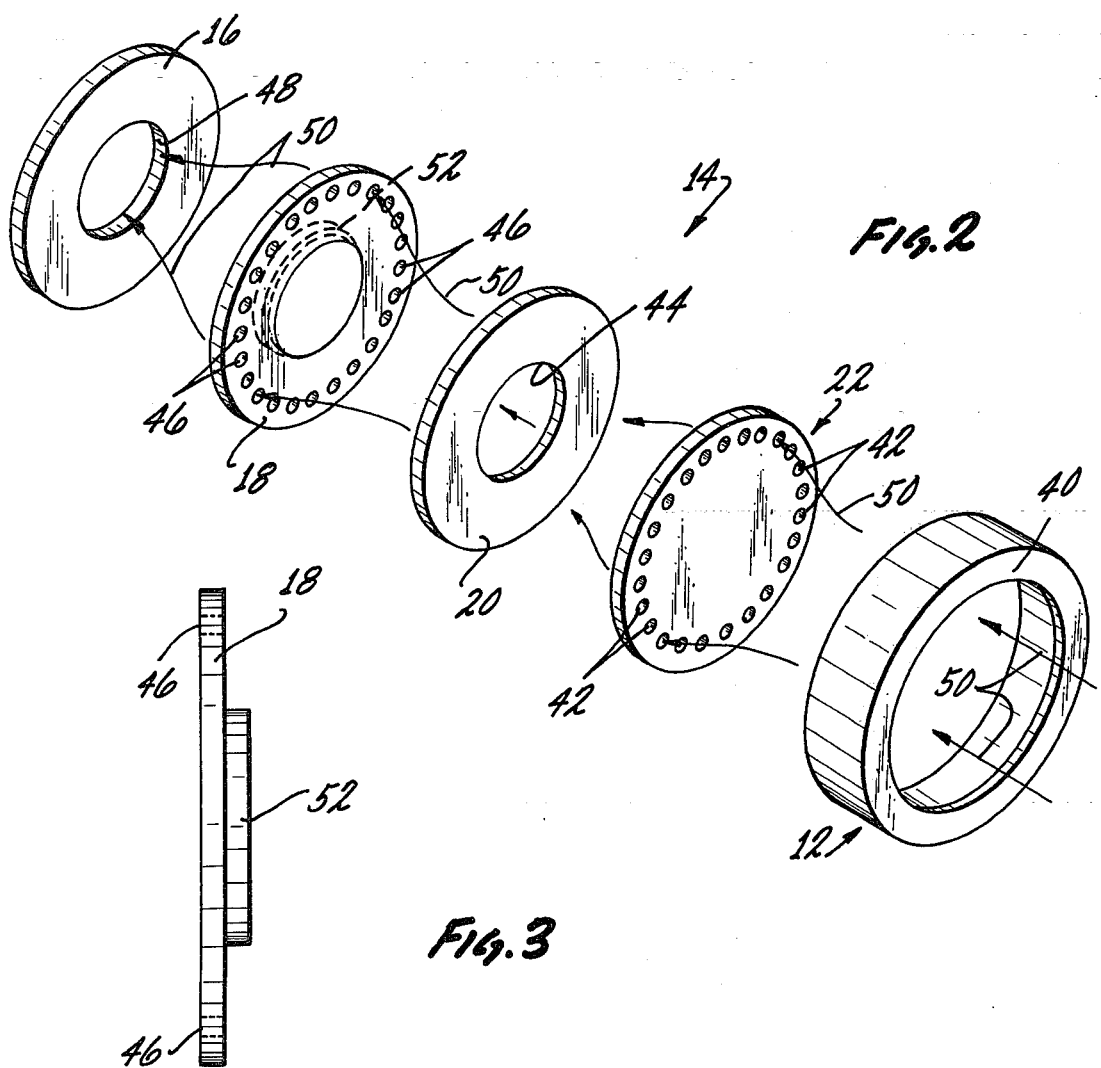
Fig. 2
Fig. 3

NARROW-BAND, AIR-COOLED LIGHT FIXTURE

BACKGROUND OF THE INVENTION

This invention relates in general to light fixtures and, more specifically, to air-cooled light fixtures adapted to emit a narrow spectral energy band.

Many optical devices include a light source and an adjacent optical system adapted to direct light in a desired direction. Typical of these are slide or motion picture projector in which a light-and-shadow or colored transparency is positioned in the optical path, stage lighting in which colored filters are interposed to provide a selected color of projected light, infrared sources in which filters in the optical path absorb all but infrared radiation and the like. A problem common to all of these systems is overheating by absorption of heat in the structure, filters, optical system, etc. The transparencies or filters are inherently heated, since all energy except in the spectral band transmitted must be absorbed. A variety of devices and systems have been designed to remove this excess heat to prevent thermal damage to system components and to permit more convenient handling and use of the light fixture. For example, excess heat in stage lighting is very uncomfortable for performers and may damage filters used to select light of different colors.

Most film projectors utilize a fan and conduits to direct a stream of air past the film gate, perpendicular to the optical axis. Typical of these arrangements are those shown in U.S. Pat. Nos. 2,395,561; 3,338,132 and 1,966,531. While generally effective in protecting the film, these systems are large and cumbersome, requiring fans and conduits outside the optical path to provide and direct the air stream. While these cool the film they are less effective in cooling the optical components and light source, which may be damaged by overheating and allow considerable heat to be emitted with the projection light.

Attempts have been made to cool optical systems by liquids circulated between a heat exchanger and the lens housing, by passing air between lens elements perpendicular to the optical axis (as described, for example, in U.S. Pat. No. 2,080,120) and the like. These arrangements are not fully effective, since sufficient heat transfer between the fluid and the optical elements is not always possible and fluid manifolds, conduits, pumps or fans, heat exchangers, etc., are required adjacent to the optical path, producing a wide, heavy and bulky assembly.

Thus, there is a continuing need for a light fixture having an effective means for removing heat from optical elements, such as filters, the housing and the energy source which is simple, light-weight, and sufficiently cool for easy handling and operation.

SUMMARY OF THE INVENTION

The above-noted problems, and others, are overcome in accordance with the light fixture of this invention which basically comprises an elongated housing having a filter pack near a first end, a light source intermediate the housing ends and a fan near the second end. The filter pack consists of a plurality of spaced filters having, in combination, selected energy transmitting and absorbing characteristics so that only energy in a desired spectral band is emitted. Each of the individual filters has one or more openings, the axis of each opening being substantially parallel to the optical axis of the filter pack. The openings are situated so that the density of filter material exists through the entire filter pack. Preferably, the openings are arranged so as to complement each other so as to provide substantially uniform light filtration effects across the entire face of the filter pack.

Openings are provided in the fixture housing beyond the fan so that when the light source and fan are operated, the fan draws air in through the filter pack openings, past the light means, then past the fan and out through the housing openings.

BRIEF DESCRIPTION OF THE DRAWING

Details of the invention and of a preferred embodiment thereof will be further understood upon reference to the drawing, wherein:

FIG. 1 is a side view of the light fixture, with the near side of the housing partially cut-away to expose internal components;

FIG. 2 is a perspective view of the filter pack of the light fixture; and

FIG. 3 is a side view of a portion of the filter pack.

DETAILED DESCRIPTION OF THE INVENTION

Referring to FIG. 1, there is seen a side elevation view, partially cut-away, of a preferred light fixture according to this invention. A cylindrical housing 10 surrounds and supports the internal components. Of course, housing 10 could have any other suitable shape, such as a square cross-section, and could be bent at either end, if desired.

A cylindrical bezel 12 at one end of housing 10 supports a filter pack 14 made up of filter elements 16, 18, 20 and 22. While four filters are shown, any suitable number can be used. The arrangement of filter elements within pack 14 will be discussed in detail below, in conjunction with the description of FIG. 2.

Any suitable optical system (not shown) such as projection lenses, condensing lenses, etc., may be contained within housing 10 near filter pack 14, if desired. Air passages through or around the optical elements, if used, must be provided so that air can pass through the length of housing 10. Next, a light source 24, typically a lamp 26 in a base 28, is mounted in housing 10 on a transverse support wall 30. Support wall 30 includes a plurality of openings 31 to permit air to pass along the interior of housing 10. Lamp 26 may be any suitable source of energy having output in any desired part of the visible light, infrared or ultraviolet spectra. Preferably, a broad band conventional projection lamp with a built-in reflector is used.

A transverse wall 32 having a plurality of openings 34 lies across the second end of housing 10. A conventional fan having a drive motor 36 and fan blades 38 is mounted on wall 32.

The arrangement of filter elements in filter pack 14 which permits cooling air to pass through while preserving effective, uniform light filtration is schematically shown in FIG. 2. Bezel 12 has a large opening 40 in the end wall to permit free entering air flow. Individual filters 16, 18, 20 and 22 are held in bezel 14 by any suitable means, such as metal clips (not shown) or glue.

The filter elements each have one or more openings, with openings in the individual filters arranged in assembling the pack so that no straight line extends through openings through the entire pack. Typically, element 22 may have a row of small openings 42 around the outer edge, element 20 may have a larger central opening 44, element 18 may have a row of outer openings 46 generally similar to openings 42 in element 22 but with element 18 mounted in bezel 14 with openings 46 in axial alignment with the spaces between openings 42 in element 22 and element 16 may have a larger central opening 48.

Preferably, the area of all openings combined in each element is substantially constant for all elements. Air flow through the pack is illustrated by arrows 50. The in-and-out or zig-zag air path through filter pack 14 creates turbulence and lengthens the air flow path, insuring maximum heat transfer from the filters to the air stream.

In order to improve filtration uniformity across the face of filter pack 14, if desired a small central disk 52 of filter material is to be applied in juxtaposition to either of elements 18 and 22. Details of which are shown in FIG. 3. Disk 52 has a diameter substantially equal to that of openings 44 and 48, and typically has the same filter characteristics (e.g., color) as filter 18 or 16.

Any suitable filter material may be used in the filters for the desired purpose. For example, filters 16, 18, 20 and 22 might be formed of blue methylmethacrylate sheet and element 18 and disk 52 might be formed of red methylmethacrylate sheet to produce a uniform purple light output. Of course, all of the filter elements may be of the same material and color. For use as a light source with night viewing devices such as silicon dioxide tube television camera, substantially pure infrared output can be provided where the filters are glass filters which absorb visible and ultraviolet light and pass infrared radiation. Typical filter materials are described, for example, in U.S. Pat. Nos. 3,334,217; 3,427,089 and 3,663,089.

In operation, fan motor 36 and lamp 26 are turned on, with blade 38 rotating in a direction such that cool air is drawn thru the filter pack 14 as seen in FIG. 1. Air moves in the direction schematically indicated by arrows 50 in FIGS. 1 and 2, entering housing 10 through filter pack 14, zig-zagging through the filter elements, past any optical elements which typically could have openings around the lens edges, etc., past lamp 26, through openings 31 and out through openings 34. The cool air stream will remove heat from the filter elements, the lamp and the interior of the housing, keeping the filters and lamp at safe operating temperatures and permitting the housing to be used and handled without danger. Much of the heat which otherwise would pass out of the housing with the light is thus carried away, making actors or other performers in front of the light fixture much more comfortable.

Other variations, ramifications and applications of this invention will occur to those skilled in the art upon reading this disclosure. These are intended to be included within the scope of this invention, as defined in the appended claims.

I claim:
1. A light fixture for projecting energy in a narrow spectral range which comprises:
   an elongated housing having openings at each end;
   a plurality of spaced filters in a pack closing the first end of said housing;
   at least one opening in each of said filters adapted to permit air to pass through said filter pack;
   said at least one opening of each filter arranged so that no straight line-of-sight exists through openings in all filters in said pack;
   said filter pack adapted to allow only energy in a selected spectral range to pass therethrough and to absorb energy out of said range;
   a broad spectrum energy source intermediate to the ends of said housing adapted to emit energy towards said filter pack; and
   a cooling means adjacent to the second end of said housing adapted to draw air in through a first end of said housing through said filter pack and past said energy source and out said second end of said housing;
   whereby energy absorbed in said housing, energy source and filter pack is removed.

2. The light fixture according to claim 1 wherein the opening in at least one of said filters is substantially at the center of the filter and the opening in at least one other filter is in the form of a plurality of holes in the filter near the edge thereof, whereby air passing through said pack is routed through a relatively long and turbulent path.

3. The light fixture according to claim 1 wherein said housing is approximately cylindrical and said filter pack is mounted in a cylindrical bezel which fits snugly over the first end of said housing.

4. The light fixture according to claim 1 wherein said filter pack is adapted to absorb all energy emitted by said energy source except infrared energy in the 0.78 to 4 micron range.

5. The light fixture according to claim 1 wherein said filter pack consists of at least four filters, alternately having openings near the filter center and near the filter edges to provide a tortuous air path through said pack.

6. The light fixture according to claim 5 wherein the total area of openings in each of said filters is substantially equal.

7. The light fixture according to claim 5 wherein different ones of the filters have different colors to provide output having a combined color, and at least one of the filters having openings along the edges has a centrally mounted filter disk having a color the same as that of one of the centrally apertured filters; whereby output color uniformity is improved.

* * * * *